United States Patent [19]
Moshfeghi

[11] Patent Number: 4,784,147
[45] Date of Patent: Nov. 15, 1988

[54] METHOD AND APPARATUS FOR SIDELOBE SUPPRESSION IN SCANNING IMAGING SYSTEMS

[75] Inventor: Mehran Moshfeghi, White Plains, N.Y.

[73] Assignee: North American Philips Corporation, New York, N.Y.

[21] Appl. No.: 939,193

[22] Filed: Dec. 8, 1986

[51] Int. Cl.$^4$ ............................................. A61B 10/00
[52] U.S. Cl. ................................................... 128/653
[58] Field of Search .............................. 128/660, 653; 73/625–626, 631, 646; 310/368–370; 367/103, 105, 153–154

[56] References Cited

U.S. PATENT DOCUMENTS

| | | | |
|---|---|---|---|
| 4,276,779 | 7/1981 | Davis, Jr. | 73/626 |
| 4,537,074 | 8/1985 | Dietz | 73/625 |

FOREIGN PATENT DOCUMENTS

| | | | |
|---|---|---|---|
| 2016695 | 9/1979 | United Kingdom | 73/625 |
| 2048478 | 12/1980 | United Kingdom | 73/626 |

OTHER PUBLICATIONS

Peterson, D. K. et al., "Quantitative Evaluation of Real-Time Synthetic Aperture Acoustic Images" in *A Review of Progress in Quantitative Non-Destructive Evaluation*, (Plenum Press, N.Y., Ed. D. O. Thompson et al.) vol. 1 (1982) pp. 767–776.

't Hoen, P. J., "Aperture Apodization to Reduce the Off-Axis Intensity of the Pulsed-Mode Directivity Function of Linear Arrays", *Ultrasonics*, Sep. 1982, pp. 231–236.

Macovski, A., "Ultrasonic Imaging Using Arrays", *Proc. of the IEEE*, vol. 67, No. 4, Apr. 1979, pp. 484–495.

Macovski, A. et al., "High Resolution B-Scan Systems Using a Circular Array", *Acoustical Holography*, vol. 6, pp. 121–143 (1975).

Biller, L. et al., "Optimization of the Radiation Patterns for an Array of Concentric Ring Sources", *IEEE Trans.*, vol. AU-21, No. 1, pp. 57–61, Feb. 1973.

Kino, G. S., "Fundamentals of Scanning Systems", *Scanned Image Microscopy* (Academic Press, London, 1980, Ed. E. A. Ash), pp. 1–21.

Burckhardt, C. B. et al., "Focussing Ultrasound Over a Large Depth with an Annular Transducer—An Alternative Method", vol. SU-22, No. 1, Jan. 1975, pp. 11–15.

Johnson, S. A. et al., "High Spatial Resolution Ultrasonic Measurement Technique for Characterization of Static and Moving Tissues", *Ultrasonic Tissue Characterization II*, Ed. M. Linzer, NBS Special Publn. No. 525 (U.S. GPO, Wash., D.C., 1970) pp. 235–246.

Norton, S. J. et al., "Ultrasonic Reflectivity Tomography: Reconstruction with Circular Transducer Arrays", Ultrasonic Imaging 1, 1979, pp. 210–231.

Kino, G. S., "Acoustic Imaging for Non-Destructive Evaluation", *Proc. of the IEEE*, vol. 67, No. 4, Apr. 1979, pp. 510–525.

Burckhardt, C. B. et al., "Ultrasonic Axicon: A Device for Focussing Over a Large Depth", *J. Acous. Soc. Am.*, vol. 54, No. 6, pp. 1628–1630, 1973.

Meindl, J. et al., "Recent Advances in the Development of New Imaging Techniques", Wiley & Sons, N.Y., 1979, pp. 175–201.

Endoh, N. et al., "Element Arrangement of Array Transducers for Sector Scanning Tomography", Bull. P.M.E. (T.I.T.) Mar. 1976 (Japan).

*Primary Examiner*—Francis J. Jaworski
*Attorney, Agent, or Firm*—Jack E. Haken

[57] ABSTRACT

The paraxial, c.w. focal zone resolution of a focussed scanning imaging system is improved by choosing the ratio of the size of the apertures which are used to transmit and receive energy from the scene such that the first and second sidelobes of the system point spread function have equal amplitudes.

4 Claims, 8 Drawing Sheets

METHOD AND APPARATUS FOR SIDELOBE SUPPRESSION IN SCANNING IMAGING SYSTEMS

The invention is an apparatus and method for suppressing the resolution-limiting effects of PSF sidelobes in scanning-type imaging systems. The invention is particularly useful in connection with medical ultrasound imaging systems which utilize an array of transducer elements to produce and receive ultrasound energy.

BACKGROUND OF THE INVENTION

Ultrasound reflection imaging is a powerful tool in diagnostic medicine. Transducer array systems are usually used in medical imaging, particularly for real-time applications. One simple form of a transducer array is the collimated imaging array. It consists of a row of individual transducer elements disposed side-by-side. The individual elements (or small groups of elements) are actuated in sequence to transmit a beam of ultrasound energy. Echo data is received on the same elements for each B-mode line in a display. This produces a rectangular format image. Such arrays have been successfully used for small organ imaging applications, such as the eyes, where relatively short wavelengths can be used. When imaging applications which require deeper penetration attenuation forces the use of larger wavelengths. Collimated imaging arrays are not used for this purpose, since diffraction causes the beam to diverge and degrades resolution.

The performance of transducer arrays has been improved by the use of controlled delay elements which produce electronic focusing. In these systems, each element receives signals from many points in the image. Signals which are received by the individual elements are appropriately delayed and summed to produce individual B-lines which form an image. Dynamic focusing may also be utilized for reception of signals. The focal length of the array is varied electronically as a pulse propagates through the body. This ensures optimum lateral resolution at all depths.

In certain applications, such as cardiac imaging, only a small window is available for the array. In these applications, a small array may be used with electronic deflection, as well as focusing, to produce a sector-scan image. These systems are referred to as "Phased Arrays," in order to distinguish them from "Linear Arrays," which project beams perpendicular to the face of the transducer elements and use only electronic focusing. The principles of the present invention apply both to Linear Arrays and Phased Arrays.

The point spread function (PSF) of a linear imaging system is the image it produces for a point object. A commonly used criteria for measuring the resolution of an imaging system is the Rayleigh criteria which characterizes the ability of the system to differentiate two closely spaced point targets. The width of the main lobe of the PSF is a measure of this ability. This criteria, although important, is not ideal for ultrasound medical imaging applications where human tissue acts as a diffusely reflecting structure. It is often important to be able to differentiate subtle tissue structures in the presence of strong reflectors. This ability is limited by the sidelobes of the PSF. It is, therefore, of great interest to develop systems with small sidelobe levels.

The conventional technique for reducing the sidelobe levels of a transducer array is "Aperture Apodization". Aperture weighting functions, such as Gaussian or Hanning functions, are applied to signals on the array elements. Such techniques are described, for example, in Peterson et al Quantitative Evaluation of Real-Time Synthetic Aperture Acoustic Images, in: A Review of Progress in Quantitative Nondestructive Evaluation (Plenum Press, New York, Vol. 1, 1982, pages 767–776) and in 't Hoen Aperture Apodization to Reduce the Off-axis Intensity of the Pulsed-mode Directivity Function of Linear Arrays, Ultrasonics, September 1982, pages 231–236, which are incorporated herein, by reference, as background material. Using these prior art techniques, the sidelobe level can be reduced at the expense of some loss in main lobe width. This trade-off is a fundamental one which is also encountered in spectral analysis and antenna design. When energy under the sidelobes is is reduced, more energy is introduced under the main lobe.

DESCRIPTION OF THE PRIOR ART

Most modern echo ultrasound imaging systems utilize a Linear Array having a lateral dimension D and employ electronic dynamic focusing during signal reception. Most Linear Array systems also employ a fixed focus during pulse transmission. (That is: the transmitter pattern is not subject to dynamic control.)

The range resolution of such an array depends on the length of the ultrasound pulse. Resolution in the elevation plane depends on the elevation dimension of the array; the focusing is usually achieved using a fixed mechanical lens.

Resolution along the lateral dimension (x) of the array pattern for a two-way system is given by:

$$Y(x) = T(x) \cdot R(x) \qquad (1)$$

where $T(x)$ and $R(x)$ are the system transmit and receive response. In the idealized case using a paraxial approximation, at the focal plane, with CW operation, a continuous aperture, and fixed transmit focus (when the same aperture is used on transmit and receive) $T(x)$ and $R(x)$ take the form $$T(x) \propto \text{Sinc}\left[\frac{Dx}{\lambda z}\right] \qquad (2)$$

$$R(x) \propto \text{Sinc}\left[\frac{Dx}{\lambda z}\right]$$

where $\lambda$ is the wavelength of sound in the medium, z is distance from the array and:

$$\text{Sinc}(a) = \frac{\sin(\pi a)}{\pi a} \qquad (3)$$

Each of the equations (2) represent the PSF of a single cylindrical lens. (For this ideal case of a distributed line source and receiver geometry, the effects of grating lobes and individual element widths are removed from the PSF.) Normalizing the system response $Y(x)$, normalizing x to units of $$\left(\frac{D}{\lambda z}\right)$$

and combining equation (1) and (2), one obtains the relationship $$Y(x) = \text{Sinc}^2(x) \qquad (4)$$

Thus the main lobe width (detail resolution) is controlled by the aperture size D. Since the system is focused on both transmit and receive, equation (4) is the square of the PSF of a single cylindrical lens. Equation (4) applies to prior art imaging systems which use the same size aperture for transmission and reception.

The technique described can be extended to analysis of systems which provide focusing in two dimensions. The most commonly used two dimensional focusing system is an annular array which comprises a number of concentric rings. By using controlled delays, the beam can be focused at different depths as described, for example, in Macovski, Ultrasonic Imaging Using Arrays, *Proceedings of the IEEE*, Vol. 67, No. 4, April 1979, pages 484–495 which is incorporated herein, by reference, as background material. Deflection of the beam may be performed by mechanical scanning of the array.

If the array has a diameter D, under the same assumptions which were used to derive equation (4), the two way response of an annular array is given by $$Y(x) = 4 \, \text{Jinc}^2(x) \qquad (5)$$

where $$\text{Jinc}(x) = \frac{J_1(x)}{x} \qquad (6)$$

and $J_1(x)$ is the first order Bessel function of the first kind. Equation (6) is the PSF of a single spherical lens at the focal plane. Only a section of the system response along x is considered because of radial symmetry.

Macovski and Norton, in High-Resolution B-Scan Systems using Circular Arrays, Acoustical Holography, Vol. 6, 1975, p. 126, describe a system using ring annuli having a diameter ratio of 1.2 or 2.0 to minimize integrated sidelobe energy.

Biller and Friedman in Optimization of Radiation Patterns for an Array of Concentric Ring Sources, IEEE Transactions on Audio and Electroacoustics, Vol. AV-21, No. 1, Feb. 1973, p. 57, describe an apodization method which distributes energy across an annular aperture by varying the spacing between annular electrodes.

SUMMARY OF THE INVENTION

An ultrasonic imaging system uses a transducer which has an aperture width D for reception and an aperture width mD for transmission, where $0 < m < 1$. Under the same set of assumptions which we used to derive equation (2), the transmit and receive system response for this system are $$T(x) = \text{Sinc}\left[\frac{mDx}{\lambda z}\right] \qquad (7)$$

$$R(x) = \text{Sinc}\left[\frac{Dx}{\lambda z}\right]$$

and the overall system response is $$Y(x) = \text{Sinc}(x) \cdot \text{Sinc}(mx) \qquad (8)$$

Equation (8) is thus the PSF of the system which is focused on transmit and receive, but in which the transmit aperture is a fraction m of the receive aperture. As the value of m increases from 0 to 1 the sidelobes of the function move closer to the main lobe and the main lobe becomes narrower. The level of the largest sidelobe of the function of equation (8), (calculated to the zero level baseline) is plotted in FIG. 1. At values of m close to unity, the amplitude of the first sidelobe A, tends toward zero and the value of the second sidelobe B approaches $\text{Sinc}^2(x)$. As m increases in value from 0, the amplitude of the first sidelobe A decreases. At $m \simeq 0.7175$, the first and second sidelobes A and B have equal amplitudes. For values of m larger than this, the second sidelobe B becomes larger than the first sidelobe A. Thus, the optimum sidelobe response is given by:

$$Y(x) = \text{Sinc}(x) \cdot \text{Sinc}\,(0.7175x) \qquad (9)$$

FIG. 2 illustrates a similar plot for the function $4\text{Jinc}(x) \cdot \text{Jinc}(mx)$ which characterizes a system in which a focused annular array with diameter D is used for reception and a concentric focused annular array with diameter mD is used for transmission. The minimum of this function occurs at $m \simeq 0.7683$, where the first and second sidelobes, A and B, have equal amplitudes.

In accordance with the invention, aperture sidelobes in scanning imaging systems can be reduced if the imaging signals are transmitted from a focused linear aperture and received in a focused linear aperture, when the effective width of the transmitting aperture is approximately 0.7175 times the effective width of the receiving aperture.

In another embodiment of the invention, the transmitting aperture is a focused annular array, the receiving aperture is a focused annular array, and the effective diameter of the transmitting aperture is approximately 0.7683 times the effective diameter of the receiving aperture.

The effects of aperture width reduction on the point spread function are symmetric. Therefore, in alternate embodiments of the invention, the sidelobes can be reduced when the effective width of a focused linear receiving array aperture is approximately 0.7175 times the effective width of the aperture of a focused linear transmitting array $$m = \frac{1}{0.7175} = 1.3937$$

and when the effective diameter of a focused annular receiving array is approximately 0.7683 times the effective diameter of a focused annular transmitting array $$\left( m = \frac{1}{0.7683} = 1.3016 \right).$$

However, for medical applications it should be noted that (for equivalent transducer sensitivity) the patient will usually be exposed to a smaller dose of ultrasound energy if the transmitting aperture is smaller than the receiving aperture.

In accordance with alternate embodiments of the invention, a reduction of at least 3 db in the effective sidelobes can be achieved when the effective aperture of a focused, transmitting linear array is either m or 1/m times the effective aperture width of a focused linear receiving array where m is fraction greater than or equal to 0.68 and less than or equal to 0.77. Similarly, a 3 db improvement in the sidelobe response of an imaging system using focused annular arrays can be achieved when the effective diameter of the transmitting and/or receiving array is either m or 1/m of the respective effective diameter of the receiving and/or transmitting array where m is a fraction greater than or equal to 0.76 and less than or equal to 0.80. A narrower main lobe is produced with an equivalent side lobe reduction, if the value of m or 1/m is greater than the optimum value (i.e. 0.7175 or 0.7683).

If aperture apodization is applied to a system which uses focused transmit and receive arrays and in which the effective aperture width of the transmit array is a fraction of the effective aperture width of the receive array in the aperture apodization functions which are applied to the transmit and receive arrays should be scaled such that they both attain the same truncation value at the edges of the respective apertures.

BRIEF DESCRIPTION OF THE DRAWINGS

The invention may be understood by reference to the accompanying drawings in which.

DESCRIPTION OF A PREFERRED EMBODIMENT

Figure 1:
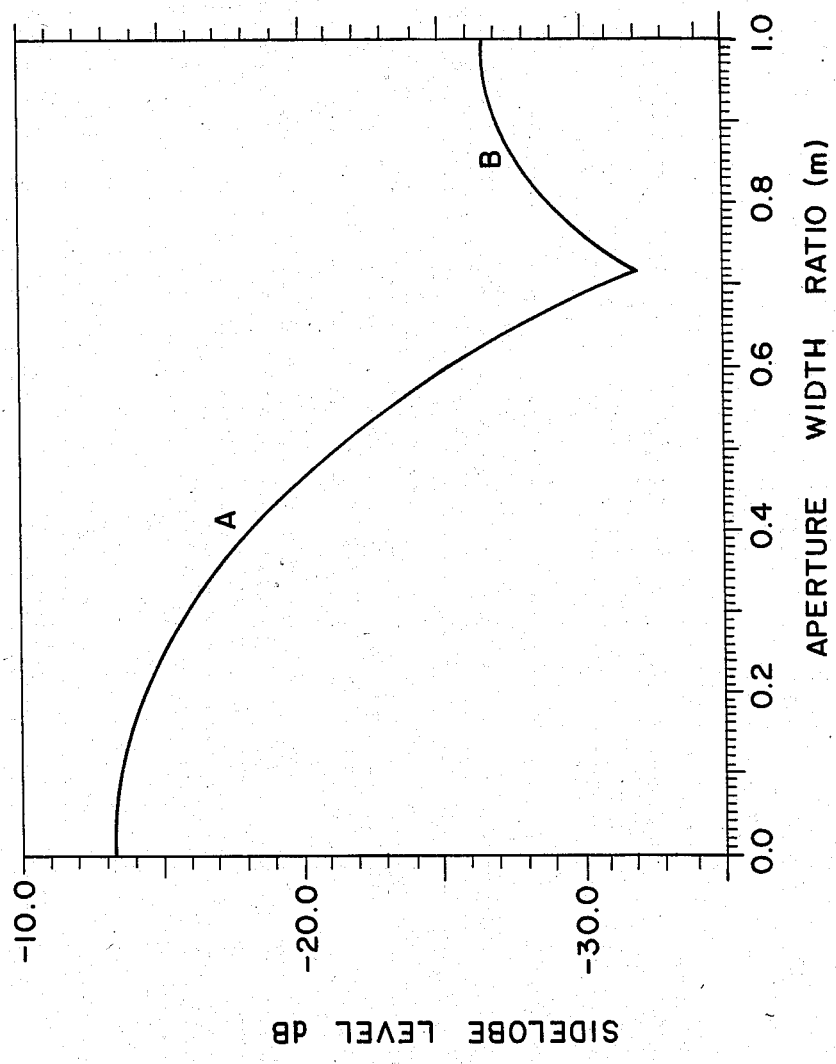
FIG. 1 illustrates the maximum sidelobe level of a linear array system as a function of the aperture width ratio, m.
Figure 2:
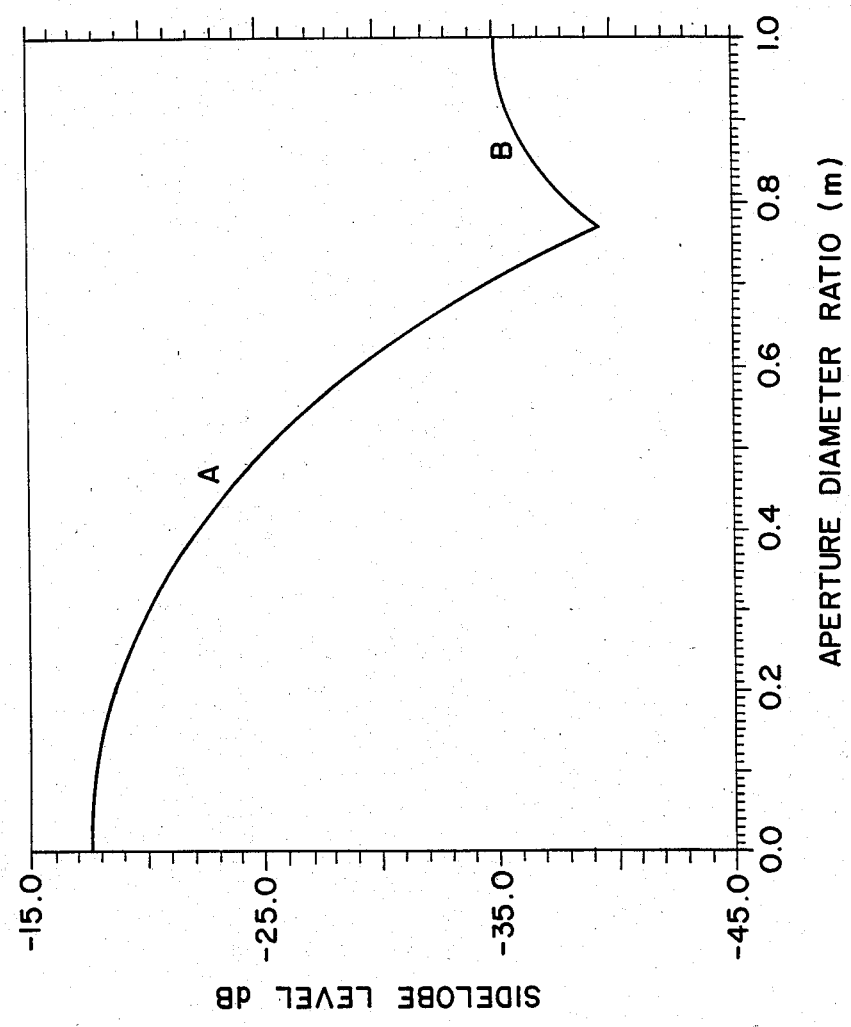
FIG. 2 illustrates the maximum sidelobe level of a annular array system as a function of the aperture diameter ratio, m.
Figure 3:
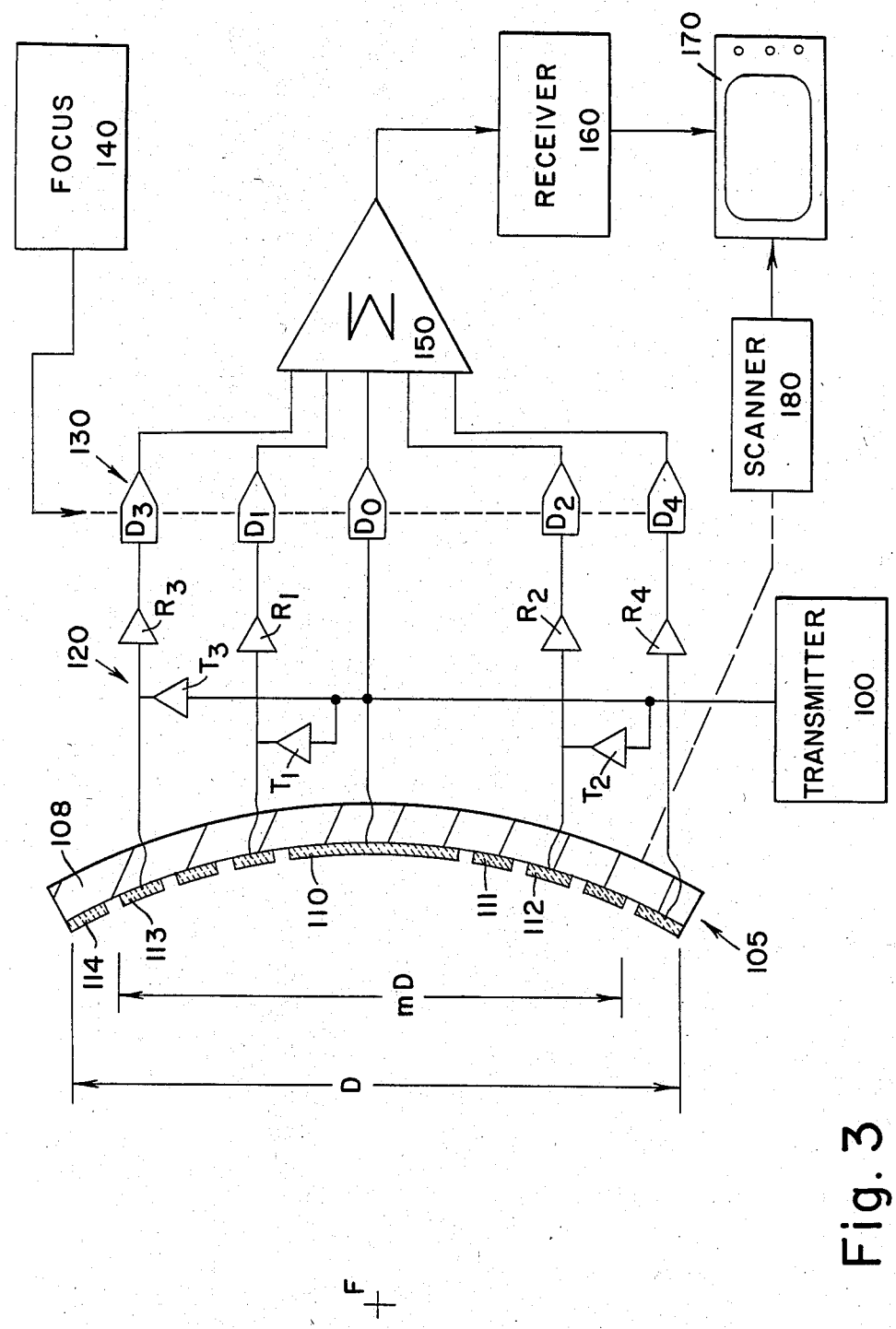
FIG. 3 schematically illustrates a preferred ultrasound imaging system of the present invention.

FIG. 3 illustrates a preferred ultrasound imaging system which utilizes the present invention. Ultrasound pulses are both transmitted and received from a focused annular ultrasound transducer array 105. The transducer comprises a concave disc of a piezoelectric ceramic material 108. A central circular electrode 110 with concentric annular electrodes 111, 112, 113 and 114 are applied on the concave, front surface of the disk (see FIG. 4) and serve to define elements of an annular transducer array. A counter electrode (not illustrated) is applied to the convex back surface of the array. The curvature of the array is calculated, in a known manner, to mechanically focus beams of ultrasound energy which are emitted from the array at a focal point F which is typically located within an object undergoing examination.

A transmitter 100 provides a periodic train of pulses of electrical energy to excite the elements of the array. Typically the pulses are Gaussian. The pulses from the transmitter 100 are applied directly to the central circular element of the array 110. The amplitude of the pulses from the transmitter 100 is reduced in a group of attenuators 120 to distribute the energy of excitation across the diameter of the array to achieve a desired apodization function. Pulses from the transmitter are applied to innermost annular ring 101 through attenuator T1, to the next outermost annular element 112 through attenuator T2, and to the third annular element 113 through attenuator T3. The pulses from the transmitter are not applied to the outermost annular electrode 114. The outer diameter of electrode 113 thus defines the effective transmitting aperture diameter mD of the array.

The transducer 105 has been illustrated, for the sake of clarity, with five concentric elements. In an actual system, the array may comprise more elements and the element widths may be adjusted, in a known manner, to achieve optimum focusing of the array.

The excitation from the transmitter causes the transducer 105 to emit a pulse of ultrasound energy toward the focal point F. Energy in the pulse may be reflected from structures in an object undergoing examination and returned as echoes to the array. The transducer 105 produces electrical signals in response to these echoes.

If aperture apodization is desired, signals from the central electrode 110 are transmitted directly to a delay element D0, while signals from the concentric elements 111 through 114 are respectively connected to delay elements D1 through D4 via attenuators R1 through R4 in order to achieve an aperture apodization function. The aperture apodization function which is produced during reception by the attenuators R1 through R4 should (as described below) different from the aperture apodization function which is produced during transmission by the attenuators T1 through T3.

The delay elements D0 through D4 operate under the control of a focus circuit 140 to change the effective focal length of the array during the reception of echoes. In a known manner, the focus circuit 140 may adjust the delays so that the focal point of the array 105 tracks the propagation of the energy pulse to achieve an optimum beam width for detection of reflected echoes.

Signals from the output of the delay elements are summed in an amplifier 150 and applied to an ultrasound receiver 160 and display 170 in a conventional manner. A mechanical scanner 180 may be used to move the array.

Figure 4:
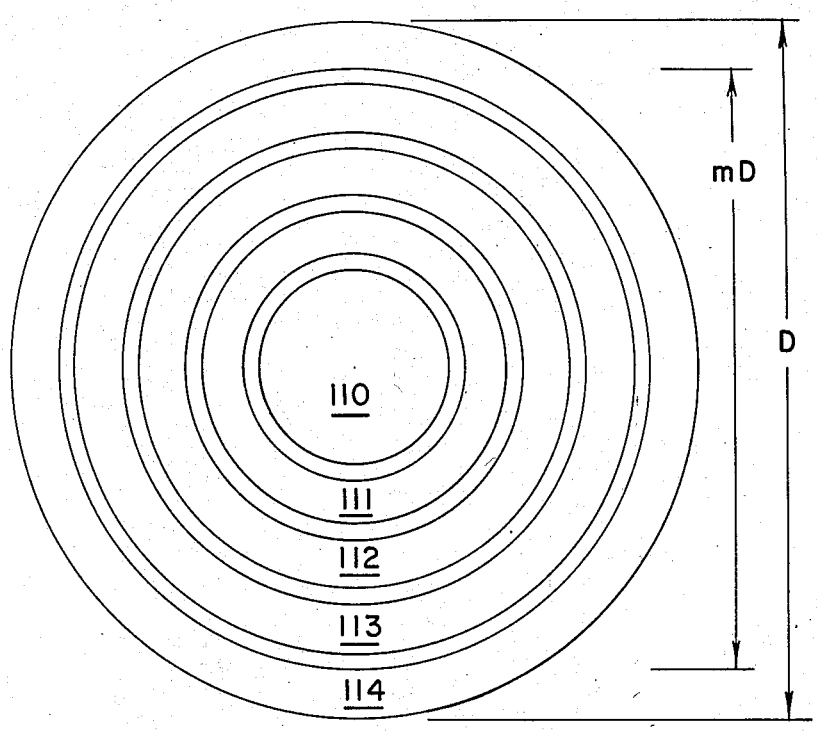
FIG. 4 illustrates an annular array of the present invention.

As illustrated in FIGS. 3 and 4, the effective diameter of the array aperture during reception D is defined by the outer diameter of the outermost electrode 114. For optimum resolution, the ratio of the outer diameters of electrodes 113 and 114, m is approximately 0.7683.

Figure 5:
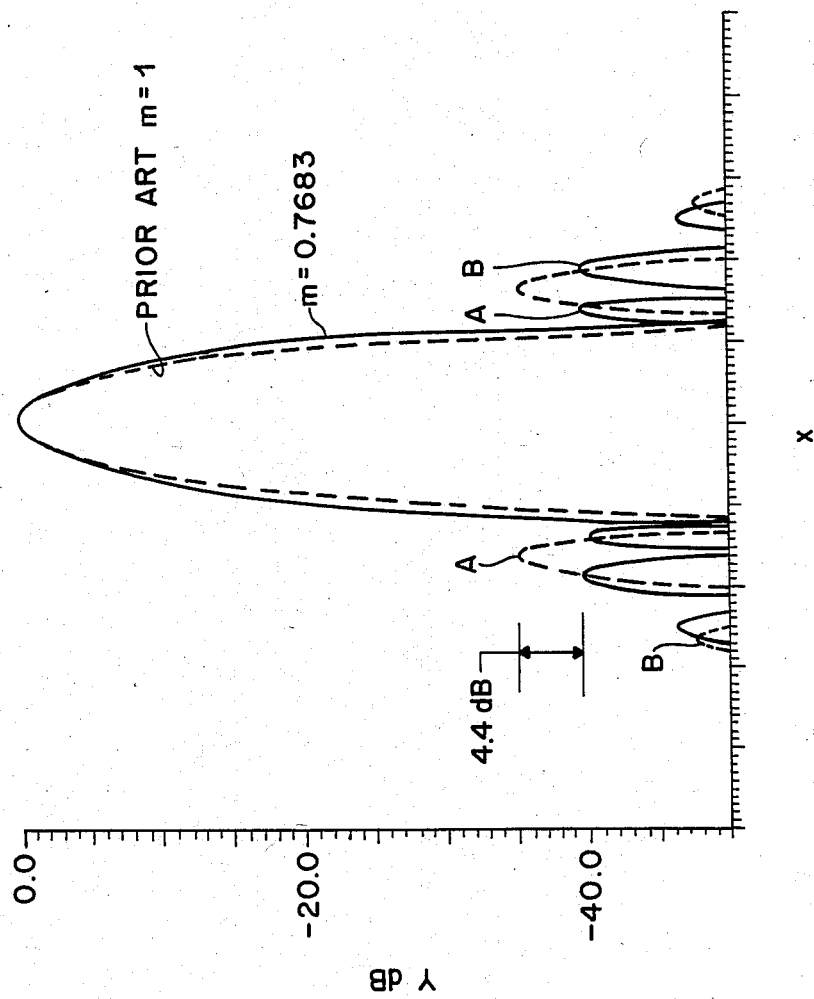
FIG. 5 compares the PSF of an optimum annular array system to the response of a system which has equal transmit and receive aperture diameters.

FIG. 5 illustrates the effect of the present invention on the PSF sidelobe distribution of an annular array. The dashed curve is the PSF for a prior art system with equal transmit and receive apertures (m=1). The solid curve is the response of a system with the optimum aperture diameter ratio (m=0.7683). A 4.4 dB reduction in the effective level of the first sidelobe is produced.

Figure 6:
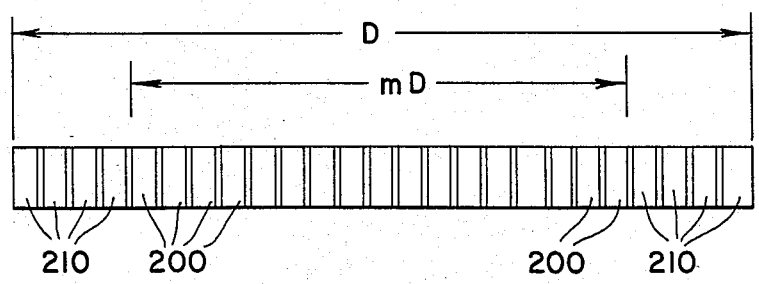
FIG. 6 is a linear array.

In a manner known in the art, a linear array of transducer elements may be used in place of the annular array 105 which is illustrated in FIG. 3 and 4. FIG. 6 illustrates a linear array which is constructed by applying a row of electrodes 200 and 210 on the surface of a block of piezoelectric ceramic material. In accordance with the invention, a system which utilizes a linear array utilizes a subset 200 of the elements for pulse transmission. The subset 200 is combined with further elements 210 during reception. The effective width of the array aperture during transmission mD is thus a fraction of the width of the array aperture D utilized for reception. The array of FIG. 6 may be focused for transmission and reception by the application of delay elements and/or mechanical lenses, or the array may be curved in a manner known in the prior art.

Figure 7:
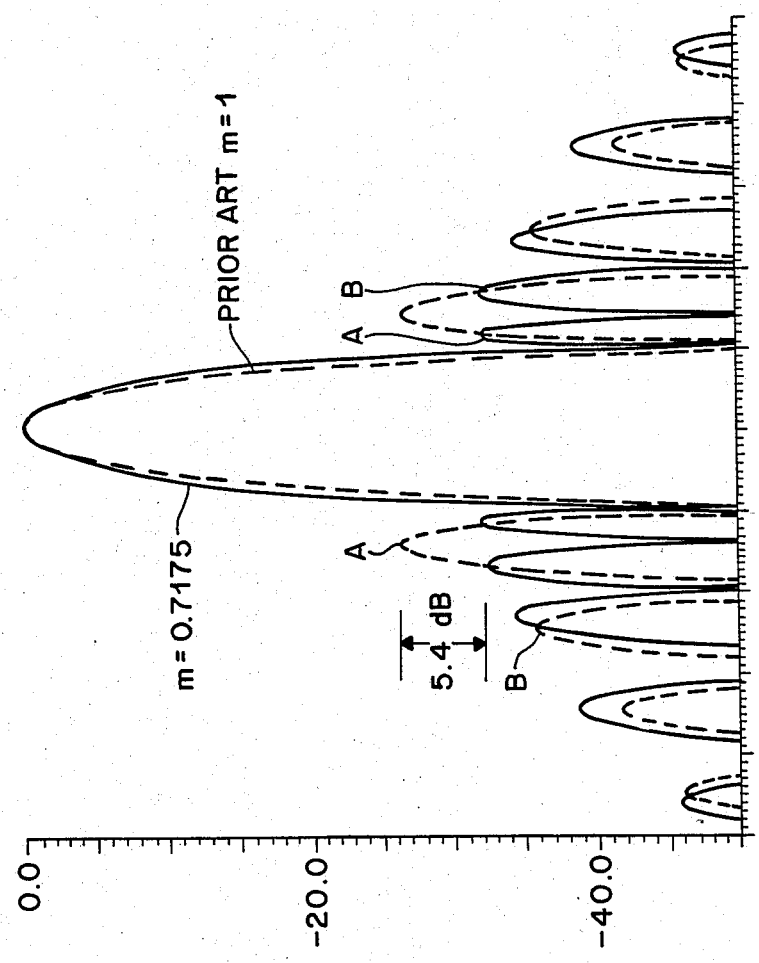
FIG. 7 compares the PSF of an optimum linear array system to the response of a system which has equal width apertures.

For a linear array, optimum sidelobe reduction occurs when the ratio of the array widths for reception and transmission, m, equals 0.7175. FIG. 7 compares the PSF sidelobe distribution of an optimum linear array of the present invention with a prior art array having equal transmit and receive widths. A 5.4 dB improvement in the first sidelobe level is obtained.

Figure 8:
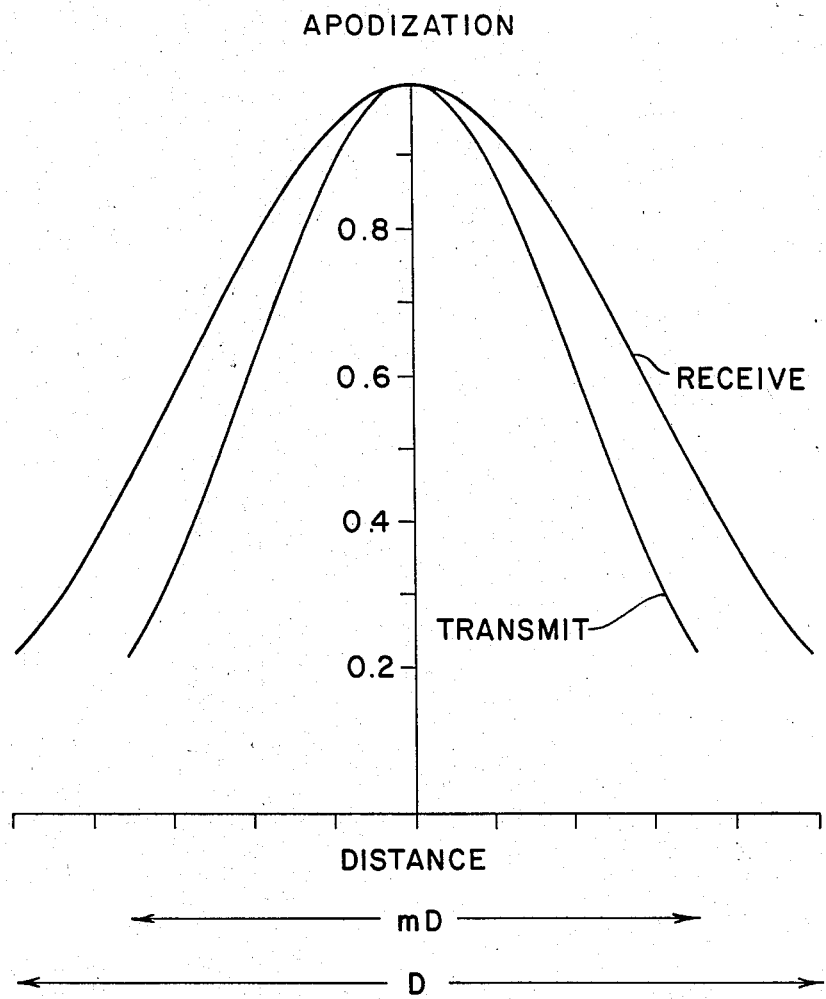
FIG. 8 illustrates aperture apodization functions for use in the present invention.

A Gaussian apodization function may be applied to the array by the attenuator 120 (FIG. 3). If apodization is applied in conjunction with the aperture ratio feature of the present invention, both the transmit and receive apertures must be apodized. If only one aperture is apodized, then the effective value of m may change. When different size apertures are used for receiving and transmission, the apodization functions must be scaled, as illustrated in FIG. 8, so that they have same truncation values at the edges of the respective apertures. FIG. 8 represents Gaussian apodization functions which are truncated at 22% values at the edges of the respective apertures.

Figure 9:
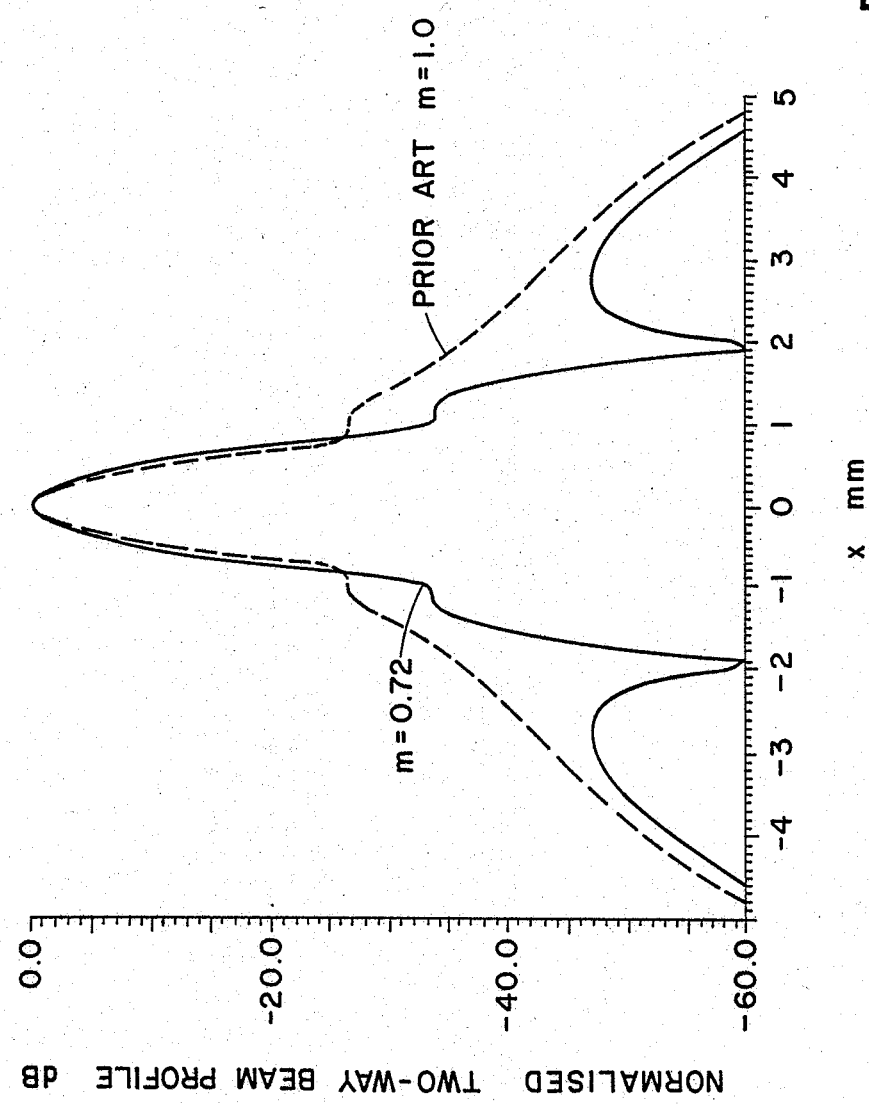
FIG. 9 compares calculated pulse responses of systems of the present invention with the prior art.

FIG. 9 compares the simulated response of an unapodized ultrasound system using linear arrays of the present invention (solid curve) with a prior art (dashed curve) equal aperture system. The plots represent a 2 MHz array with one hundred elements, an element spacing of 1 mm and an electronic focal length of 100 mm. The full aperture contains one hundred elements. Optimum sidelobe reduction occurs when m=0.7175. Seventy-two elements are used during transmission to approximate this value, thus m=0.72. The transmission excitation pulses are in the form $$P(t) = e^{-(t/T)^2} \cos 2\pi ft$$

where f is the center frequency (2 MHz) and 2T is the pulse width between the 1/e points of the Gaussian. FIG. 9 illustrates the normalized two way beam profile response for T=0.5 microseconds. It may be seen that the 25 db main lobe width of the present invention is comparable with that of the prior art while the sidelobe energy has been substantially reduced.

The invention is not restricted to medical ultrasound applications, but is generally applicable to nondestructive testing system and to any focussed, scanning imaging system, for example confocal optical and acoustic microscopy, axicon imaging, and synthetic focussing systems.

What is claimed:

1. In a scanning imaging system which comprises transmitting means for directing energy to a focal zone using a first aperture, receiving means for receiving energy from said focal zone using a second aperture and means for scanning said focal zone with respect to an object to produce an image, the improvement wherein the ratio of the size of said first aperture to the size of said second aperture is a number $m \geqq 1$ chosen such that the amplitudes of the first and second sidelobes of the system point spread function are approximately equal.

2. The improvement of claim 1 wherein the apertures are circular and either the ratio m or the inverse ratio 1/m of their diameters is approximately 0.7683.

3. The improvement of claim 1 or 2 wherein the system is an echo ultrasound system.

4. The improvement of claim 1 or 2 wherein the system further comprises means for apodizing the distribution of energy across both of said apertures so that the apodization functions have the same threshold values at corresponding edges of the respective apertures.

* * * * *